A. E. MILLER.
STEERING POST LOCKING MEANS.
APPLICATION FILED SEPT. 4, 1919. RENEWED DEC. 21, 1920.
1,384,707.  Patented July 12, 1921.
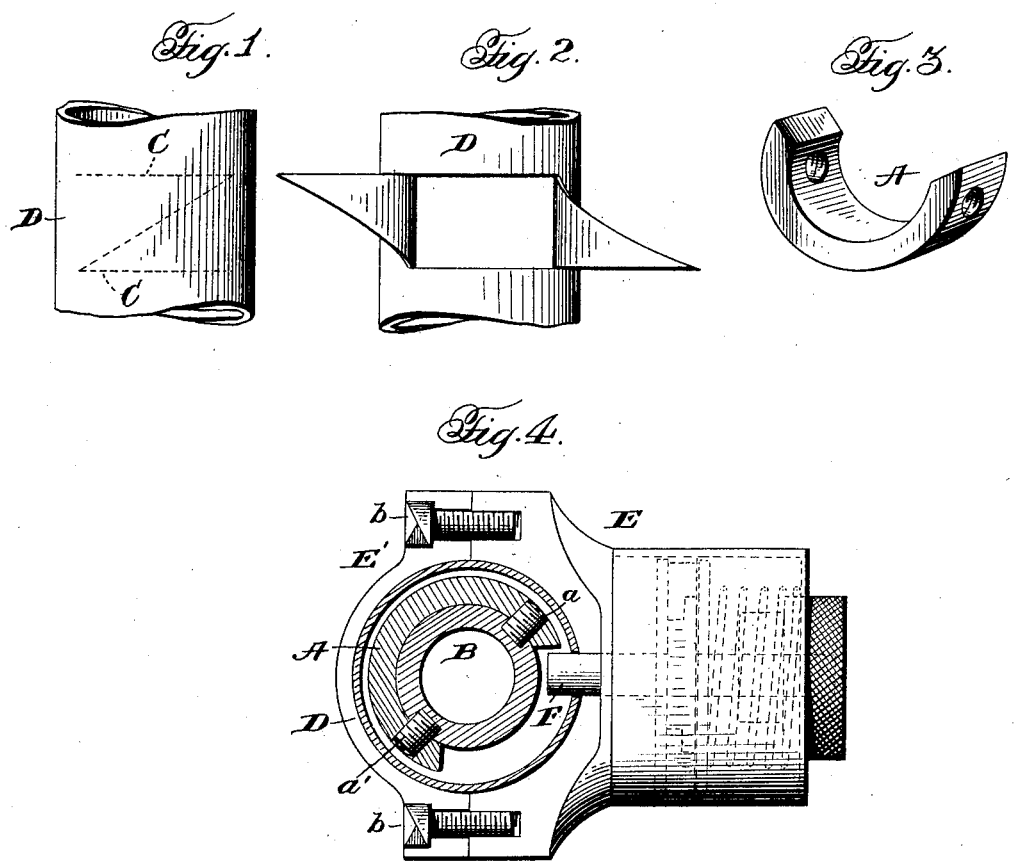
Witness:
Jas E Hutchinson
Inventor:
Arthur E. Miller,
By T. Walter Fowler,
Attorney

UNITED STATES PATENT OFFICE.

ARTHUR E. MILLER, OF SACRAMENTO, CALIFORNIA.

STEERING-POST-LOCKING MEANS.

1,384,707. Specification of Letters Patent. Patented July 12, 1921.

Application filed September 4, 1919, Serial No. 321,710. Renewed December 21, 1920. Serial No. 432,305.

*To all whom it may concern:*

Be it known that I, ARTHUR E. MILLER, a citizen of the United States, residing at Sacramento, in the county of Sacramento and State of California, have invented certain new and useful Improvements in Steering-Post-Locking Means, of which the following is a specification.

My invention relates to certain new and useful improvements in means for locking the steering post of an automobile, bicycle or the like, after the wheels have been turned to one side or the other of a straight line, so that the machine cannot be operatively driven forward by an unauthorized person, thereby safe-guarding the machine when left in the owner's absence and overcoming the loss and annoyance which are caused by the pilfering of the machine without the owner's knowledge.

With the above and other objects in view, my invention consists in the parts and the constructions, arrangements and combinations of parts forming the safety locking means which I will hereinafter fully describe and point out in the appended claims.

In the accompanying drawings forming part of this specification and in which similar reference characters indicate like parts in the several views:

Figure 1 represents an elevation of a fragment of the housing, showing by dotted lines a proposed cut to be made therein.

Fig. 2 illustrates the same housing in which the cut has been made for the admission of the segmental locking sleeve.

Fig. 3 is a perspective view of the segmental locking sleeve detached.

Fig. 4 is a cross sectional view of the steering post, locking sleeve, and housing and an elevation, partially in section, of a lock casing applied thereto.

In the prior Patents Nos. 1,312,938 and 1,312,939, both dated August 12, 1919, and issued to Clarence E. Anable, there is disclosed a form of lock for the steering post of an automobile or the like to which the present improvements are directly related.

Heretofore, as far as I am advised, the locking devices which have been applied to steering-posts and the like have included a sleeve in the form of a complete circle with a rectangular hole or recess cut or otherwise made therein for the reception of the bolt of the lock which is used. One serious difficulty with the prior constructions employing the said complete sleeves, is that such sleeves can only be removed from the steering-post by first taking off the steering-wheel and then removing the post and the usual spark and gas control elements which are associated therewith. Also, in other constructions, where a locking-sleeve is omitted, and a hole is drilled into the steering-post for the reception of the locking-bolt, a recognized objection is that the drilling of the hole weakens the post and holds the steering wheel rigid in one position, while the car is locked. To meet these objections I employ a sleeve, A, which is in the form of a segment; in other words, the sleeve is less than a complete circle so as to provide a sufficient space between the ends of the sleeve to allow for limited right and left movement of the steering wheel after the same has been locked with the vehicle wheels at an angle to the forward direction of travel.

In applying the segmental sleeve directly to the steering-post, B, I first cut a suitable substantially rectangular opening, C, in the housing, D, and which cut may be made on the dotted lines of Fig. 1, so that there is presented an opening of sufficient area to admit the segmental sleeve, which is to be applied directly to the internal steering-post. The sleeve is preferably made of forged steel and from a rectangular plate, which is bent or curved to represent a little more than half a circle and the material of which the sleeve is formed is designed to have sufficient resiliency or "spring" to permit the said sleeve to expand slightly when forcibly pressed laterally upon the portion of the steering-post which is exposed through the opening made in the aforesaid housing, said sleeve contracting with sufficient force to firmly attach itself to said post. When the sleeve has been thus inserted and temporarily attached to the post, I secure it in place by means of fastenings or set screws, *a*.

The steering-post and its surrounding housing, D, are shown in Fig. 4, as having attached to them a lock casing, E, and securing stirrup, E', said casing containing complementary locking mechanism which may be of the general character shown in the patents first above mentioned, but which mechanism is not shown in detail since it forms no essential part of the present invention and it being sufficient to say that I prefer to use a lock having a longitudinally movable and axially turnable bolt, F, such as appears in the aforesaid prior patents, and which lock is so placed that the bolt thereof is designed to radially enter the space between the two ends of the segmental locking sleeve, A, the length of said space being such, preferably, that the front wheels when locked either to the right or to the left, may be turned a little more to the right or to the left; in other words, the length of said space is in excess of the diameter of the bolt, which is desirable as such an arrangement does not call for the accurate register of the end of the bolt with a notch or opening of substantially similar size, as is the case with many of the prior constructions. In brief, the sleeve is so attached to the steering-post that the front wheels may be locked to the left or right, but they can also be turned farther to the left (or right if locked to the right), the size of the space, however, enabling one to readily lock the car with its wheels at a desired angle.

If the space or opening to receive the locking bolt was small or approximately only equal to the diameter of the entering end of the bolt, the vehicle wheels would have to be turned exactly to a certain point to make the opening register with the end of the bolt, but with a sleeve such as I have described and shown, the wheels, after they are turned to a certain angle, may be turned almost to any degree to the left farther than that and the car will still be locked against unlawful appropriation.

In installing the before described parts, the front wheels of the vehicle may be first set at a slight angle to the left. Then by the use of a one-half taper bit I bore a hole in the steering post housing, allowing the bit to spot the steering-post. I then cut an opening in the opposite side of the housing, as shown at Fig. 2, making the hole large enough to admit the locking sleeve, A, which sleeve I insert into the opening and spring it over the steering-post and set it so that the left hand side of the sleeve is about three-eighths of an inch from the spot placed on the steering-post by the bit, before mentioned. The opposite portions of the sleeve are provided with threaded openings and I center-punch the post through one of these holes and then slide the sleeve around on the post to afford room to drill the hole in the post for the said screw. When the hole has been properly formed I slide the sleeve back into place and insert a set-screw, a, and then turn the post around and bore a second hole in the post and place a second set-screw, a, in position and distort or otherwise spread the threads to prevent the screws from working loose. I next place the lock on the housing with temporary screws that can be removed and after making sure that the locking bolt is properly centered and does not bind on the sides of the hole in the housing, I replace the temporary screws with the safety screws, b, of the preferred type shown and described in Patent No. 1,312,409, dated August 5, 1919, and tighten the lock into place. Other methods of securing the lock may, however, be resorted to without affecting the salient features of the present invention.

Among the advantages which can be attributed to my invention are, the obtaining of a locking sleeve that can be put on the steering-post without removing the steering wheel or disturbing the gas and spark controls and the housing which surrounds the post, which is important because I have found by experimenting with other constructions that the fitting of the existing locking means entailed a cost of from $5.00 to $10.00 and generally resulted in a dislodgment of the spark and gas controlling features, which caused an additional expense for re-arrangement thereof. Also, there is a saving of time, which is extremely important to the owner of the car and important to the purchaser of one of my locking devices, because my construction enables one man to put on four or five of the locking devices where he could put on only one under the old method in the same time. Another feature of advantage is the ease with which the locking means is installed, the simplicity of the operation of the parts used in the construction, and the fact that my sleeve allows the steering wheel of the vehicle to be turned back and forth a short distance, the end of the locking pin having therefore considerable space for operation between the two ends of the sleeve, but this space not being sufficient to permit the front wheels of the vehicle to be brought into a straight line so that the car can be driven straight ahead. In other words, my present improvement answers all the requirements of the existing locking sleeve formed as a complete circle or band with a rectangular locking space cut therein, but it obviates the loss of time and expense, the annoyance of the dislodgment of the gas and spark controls and other and undesirable features which go with the attaching or detaching of present locking sleeves; at the same time my invention gives a larger locking space than is obtained by merely drilling a hole in the post and my sleeve does not weaken but in fact strengthens the post and makes it easy to turn the wheels to the proper angle for locking the car, whereas, under the old methods where a hole is made in the post, it is necessary to turn the wheels to the exact angle, no more and no less, in order to bring the hole into register with the end of the locking bolt and which hole even though small weakens the post. It will be understood that my sleeve can be put on so that the car wheels are locked turned to the left and so that they cannot be turned straight, or the sleeve can be so attached that the wheels are locked turned to the right, and not capable of being straightened, or said sleeve can be so attached that the car wheels are locked in straight ahead direction, but to conform to the usual city ordinances, the sleeves are generally so attached as to lock the wheels to the left.

Having thus described my invention what I claim as new and desire to secure by Letters Patent is:—

1. The combination with a steering post of a wheeled vehicle, and a locking bolt therefor, of a locking sleeve of substantially crescent-shape having the space between its ends for the reception of said bolt, the ends of the sleeve serving as abutments to insure the locking of the wheels of the vehicle at such an angle either to the left or right that the vehicle cannot be driven or towed away, but will be directed only in a circular path and in a direction according to the position the sleeve is attached to said post.

2. In combination with the steering post of an automobile an apertured housing therefor and a lock having a bolt, a locking sleeve in the form of an incomplete circle adapted to be inserted through the aperture of said housing and having sufficient space between its ends to permit the sleeve to be laterally forced over and onto said post without removal of the post, said space being provided for the reception of the bolt of said lock.

3. In combination with the steering post of an automobile an apertured housing therefor and a lock having a bolt, a locking sleeve in the form of an incomplete circle adapted to be inserted through the aperture of said housing and having sufficient space between its ends to permit the sleeve to be laterally forced over and onto said post without removal of the post, said space being provided for the reception of the bolt of said lock, and fastenings for fixedly securing the sleeve to said post.

4. In combination with the steering post of an automobile an apertured housing therefor and a lock having a bolt, a locking sleeve in the form of an incomplete circle adapted to be inserted through the aperture of said housing and having sufficient space between its ends to permit the sleeve to be laterally forced over and onto said post without removal of the post, fastenings for fixedly securing the sleeve to said post, said bolt adapted to enter said space and thereby secure the steering wheels of the vehicle at an angle, and the length of said space permitting further limited rotation of the post but not sufficient movement to enable the steering wheels to be brought into a straight forward position.

5. A locking means for a wheeled vehicle, said means comprising the combination with a steering-post, of a sleeve fixed thereto and a lock having a bolt operating at right angles to the sleeve and adapted to secure the vehilcle wheels at an angle, said sleeve having spaced abutments for the bolt, the distance between said abutments being in excess of the diameter of the bolt whereby the steering-post may be freely turned within certain limits but cannot be turned sufficiently to position the vehicle wheels straight ahead.

In testimony whereof I affix my signature.

ARTHUR E. MILLER.